United States Patent
Yamamori et al.

(10) Patent No.: US 8,146,705 B2
(45) Date of Patent: Apr. 3, 2012

(54) OSCILLATING GEAR DEVICE, TRANSMISSION RATIO VARIABLE MECHANISM, AND MOTOR VEHICLE STEERING SYSTEM

(75) Inventors: Motoyasu Yamamori, Nagoya (JP); Makoto Yamasawa, Higashihiroshima (JP)

(73) Assignees: Jtekt Corporation, Osaka-shi (JP); Ogino Kogyo Co., Ltd., Aki-gun (JP)

( * ) Notice: Subject to any disclaimer, the term of this patent is extended or adjusted under 35 U.S.C. 154(b) by 183 days.

(21) Appl. No.: 12/716,698

(22) Filed: Mar. 3, 2010

(65) Prior Publication Data
US 2010/0224435 A1 Sep. 9, 2010

(30) Foreign Application Priority Data
Mar. 9, 2009 (JP) .................................. 2009-55359

(51) Int. Cl.
*B62D 5/04* (2006.01)
*F16H 23/00* (2006.01)
(52) U.S. Cl. ........ 180/444; 180/446; 180/443; 180/430; 180/429; 180/431; 475/163; 475/149
(58) Field of Classification Search .................. 180/444, 180/430, 429, 431, 443, 446; 475/163, 149
See application file for complete search history.

(56) References Cited

U.S. PATENT DOCUMENTS

| | | | |
|---|---|---|---|
| 7,147,582 B2* | 12/2006 | Mingishi et al. | 475/163 |
| 7,303,045 B2* | 12/2007 | Yamamori et al. | 180/444 |
| 2005/0155812 A1* | 7/2005 | Yamamori et al. | 180/444 |
| 2007/0261909 A1* | 11/2007 | Higashi et al. | 180/446 |
| 2009/0044651 A1* | 2/2009 | Yamamori et al. | 74/461 |
| 2009/0101431 A1* | 4/2009 | Yamanaka | 180/447 |
| 2010/0170742 A1* | 7/2010 | Shimizu et al. | 180/443 |
| 2010/0224436 A1* | 9/2010 | Shiina et al. | 180/444 |
| 2010/0282535 A1* | 11/2010 | Saitou et al. | 180/444 |
| 2011/0108355 A1* | 5/2011 | Shiina et al. | 180/444 |

FOREIGN PATENT DOCUMENTS

| | | |
|---|---|---|
| EP | 0 332 450 A2 | 9/1989 |
| JP | A-2005-351384 | 12/2005 |
| JP | A-2006-46405 | 2/2006 |
| JP | A-2006-82718 | 3/2006 |
| JP | A-2007-170624 | 7/2007 |
| JP | A-2008-30747 | 2/2008 |

OTHER PUBLICATIONS

Search Report issued in European Patent Application No. 10155759.3, on May 7, 2010.

* cited by examiner

*Primary Examiner* — Joanne Silbermann
*Assistant Examiner* — Marlon Arce
(74) *Attorney, Agent, or Firm* — Oliff & Berridge, PLC

(57) ABSTRACT

An oscillating gear device includes an axially fixed gear piece rotatable around a first axis and an axially oscillating gear piece that oscillates while being inclined with respect to the first axis. A plurality of pins held by one of the gear pieces engage with a plurality of tooth grooves of the other gear piece in engagement regions at a predetermined length in longitudinal directions of the pins. A formula $r_{C0}/r_{F0}=Z_C/Z_F$ is satisfied, where $r_{C0}$ is a distance between an arbitrary point on the central axis of the pin in a corresponding section corresponding to the engagement regions of the pin as viewed in the radial direction of the pin and the first axis, $r_{F0}$ is a distance between the arbitrary point and the second axis, $Z_C$ is the number of pins of the one gear piece, and $Z_F$ is the number of tooth grooves of the other gear piece.

12 Claims, 11 Drawing Sheets

US 8,146,705 B2

OSCILLATING GEAR DEVICE, TRANSMISSION RATIO VARIABLE MECHANISM, AND MOTOR VEHICLE STEERING SYSTEM

BACKGROUND OF THE INVENTION

1. Field of the Invention

The present invention relates to an oscillating gear device, a transmission ratio variable mechanism, and a motor vehicle steering system.

2. Description of Related Art

An oscillating gear device including an oscillating gear piece is proposed (for example, refer to Patent Documents 1, 2, and 3). In Patent Document 1, an oscillating gear device is applied to a motor vehicle steering system including a transmission ratio variable mechanism capable of varying a steering angle ratio. In Patent Documents 2 and 3, an oscillating gear device is applied to a speed changing device.

The oscillating gear device includes first and fourth gear pieces facing to each other, and an oscillating gear piece that is disposed between the first and fourth gear pieces and inclined with respect to the first and fourth gear pieces. The oscillating gear piece includes a second gear that engages with the first gear and a third gear that engages with the fourth gear. In more detail, the engagement between the first gear and the second gear is realized by engagement between pins provided on the first gear and tooth grooves provided on the second gear.

[Patent Document 1] Japanese Unexamined Patent Publication No. 2006-82718

[Patent Document 2] Japanese Unexamined Patent Publication No. 2005-351384

[Patent Document 3] Japanese Unexamined Patent Publication No. 2006-46405

In a motor vehicle steering system, suppression of vibration and noise is demanded. In the gear shifting device, suppression of vibration and noise is also demanded.

Therefore, it is an object of the present invention to provide an oscillating gear device, a transmission ratio variable mechanism, and a motor vehicle steering system that are capable of effectively suppressing vibration and noise.

SUMMARY OF THE INVENTION

The oscillating gear device of the present invention includes an axially fixed gear piece that is rotatable around a first axis and an axially oscillating gear piece that oscillates while being inclined with respect to the first axis. A plurality of pins held by one of the gear pieces engage with a plurality of tooth grooves of the other gear piece in engagement regions at a predetermined length in longitudinal directions of the pins. A formula $r_{C0}/r_{F0} = Z_C/Z_F$ is satisfied, where $r_{C0}$ is a distance between an arbitrary point on the central axis of the pin in a corresponding section corresponding to the engagement regions of the pin as viewed in the radial direction of the pin and the first axis, $r_{F0}$ is a distance between the arbitrary point and the second axis, $Z_C$ is the number of pins of the one gear piece, and $Z_F$ is the number of tooth grooves of the other gear piece.

DETAILED DESCRIPTION OF PREFERRED EMBODIMENTS

In the embodiment, description is given by assuming a case in which an oscillating gear device is applied to a transmission ratio variable mechanism of a motor vehicle steering system. The oscillating gear device of the present invention can also be used for purposes other than a transmission ratio variable mechanism of a motor vehicle steering system.

Figure 1:
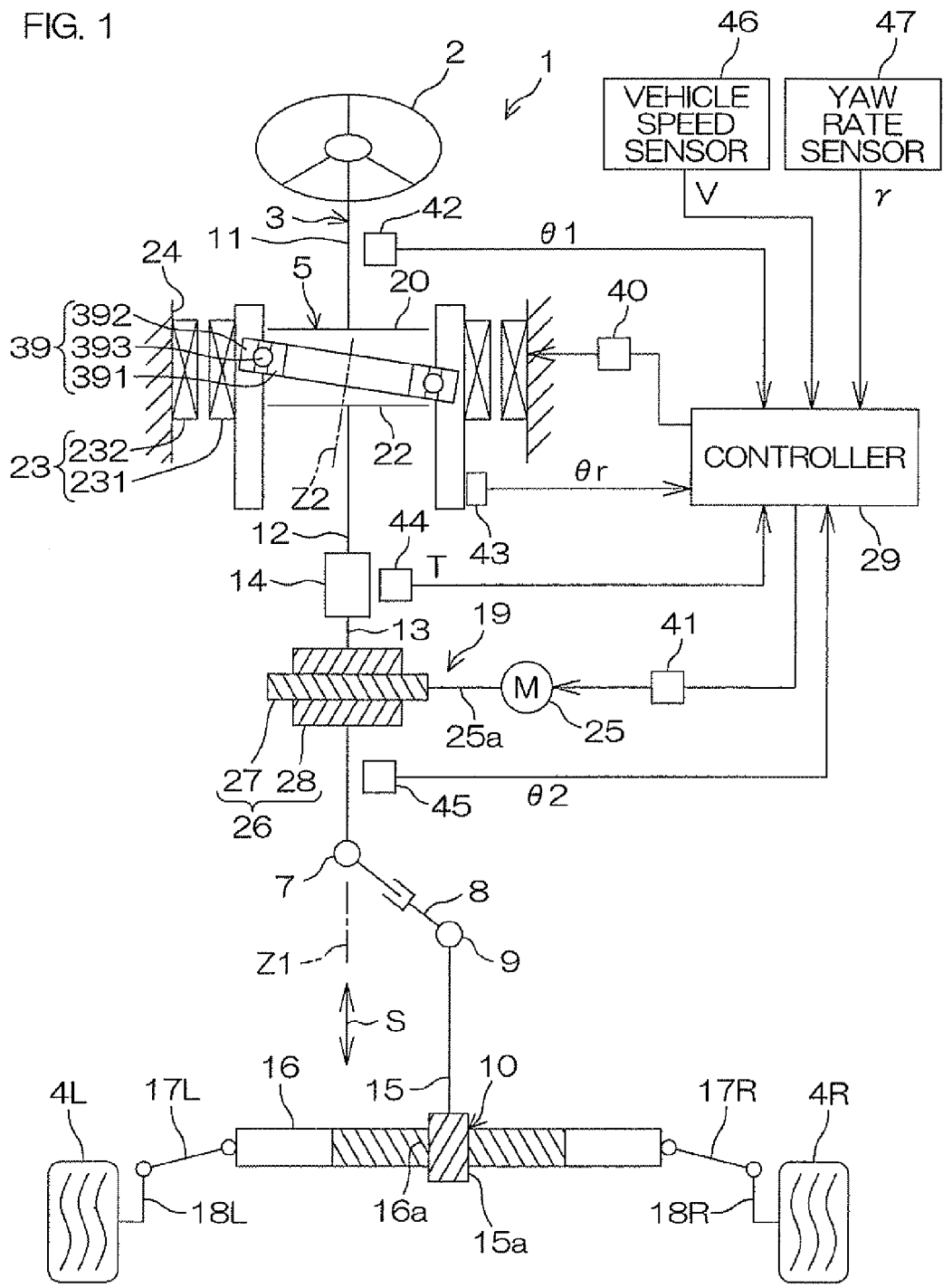
FIG. 1 is a schematic view showing a general arrangement of a motor vehicle steering system including a transmission ratio variable mechanism according to an embodiment of the present invention.

FIG. 1 is a schematic view of a general arrangement of a motor vehicle steering system to which an oscillating gear device according to an embodiment of the present invention is applied. Referring to FIG. 1, the motor vehicle steering system 1 performs turning by supplying a steering torque imparted to a steering member 2 such as a steering wheel, etc., to right and left steered wheels 4R and 4L via a steering shaft 3, etc. The motor vehicle steering system 1 has a VGR (Variable Gear Ratio) function capable of altering a transmission ratio $\theta_2/\theta_1$ that is a ratio of the output superimposed angle $\theta_2$ of output of the steering shaft 3 to the steering angle $\theta_1$ of input thereof.

The motor vehicle steering system 1 includes the steering member 2 and the steering shaft 3 linked to the steering member 2. The steering shaft 3 includes first, second, and third shafts 11, 12, and 13 disposed mutually coaxially. The central axes of the first to third shafts 11 to 13 are rotation axes of the first to third shafts 11 to 13.

One end of the first shaft 11 is coupled to the steering member 2 rotatably together. The other end of the first shaft 11 and one end of the second shaft 12 are coupled differentially rotatably via a transmission ratio variable mechanism 5. The second shaft 12 and the third shaft 13 are coupled so as to elastically rotate relative to each other in a predetermined range and transmit power via a torsion bar 14.

The third shaft 13 is linked to steered wheels 4R and 4L via a universal joint 7, an intermediate shaft 8, a universal joint 9, and a turning mechanism 10, etc.

The turning mechanism 10 includes a pinion shaft 15 linked to the universal joint 9, and a rack shaft 16 as a turning shaft that has a rack 16a to engage with a pinion 15a on the tip end of the pinion shaft 15 and extends in the right-left direction of the motor vehicle. To a pair of end portions of the rack shaft 16, knuckle arms 18R and 18L are coupled via tie rods 17R and 17L, respectively.

With the above-described arrangement, the rotation of the steering member 2 is transmitted to the steering mechanism 10 via the steering shaft 3, etc. In the turning mechanism 10, the rotation of the pinion 15a is converted into a movement in the axial direction of the rack shaft 16. The movement in the axial direction of the rack shaft 16 is transmitted to the corresponding knuckle arms 18R and 18L via the tie rods 17R and 17L, and these knuckle arms 18R and 18L rotate. Accordingly, the corresponding steered wheels 4R and 4L coupled to the knuckle arms 18R and 18L are steered.

The transmission ratio variable mechanism 5 is for varying the rotation transmission ratio (transmission ratio $\theta 2/\theta 1$) between the first and second shafts 11 and 12 of the steering shaft 3, and is a neutation gear mechanism. This transmission ratio variable mechanism 5 includes an input member 20 provided on the other end of the first shaft 11, an output member 22 provided on one end of the second shaft 12, and a bearing ring unit 39 as an intermediate member interposed between the input member 20 and the output member 22.

The input member 20 is coupled to the steering member 2 and the first shaft 11 so as to transmit a torque. The output member 22 is coupled to the second shaft 12 as a steered wheel side member so as to transmit a torque. The output member 22 is linked to the steered wheels 4R and 4L via the second shaft 12 and the turning mechanism 10.

The input member 20 is supported rotatably around the central axis of the input member 20. The output member 22 is supported rotatably around the central axis of the output member 22. The central axis of the input member 20 and the central axis of the output member 22 are matched with the first axis Z1.

The above-described bearing ring unit 39 includes an inner race 391 as a first bearing ring, an outer race 392 as a second bearing ring, and rolling elements 393 such as balls interposed between the inner race 391 and the outer race 392, and forms a ball bearing.

As the rolling elements 393, cylindrical rollers, needle rollers, or tapered rollers can be used as well as balls. The rolling elements 393 may be arranged in a single row, or may be arranged in double rows. Arrangement of the rolling elements 393 in double rows is preferable for preventing the inner race 391 from tilting with respect to the outer race 392. As a bearing including rolling elements arranged in double rows, there is a double row angular contact ball bearing, for example.

The inner race 391 couples the input member 20 with the output member 22 differentially rotatably. The inner race 391 and the outer race 392 have a common central axis that is inclined with respect to the first axis Z1. The inner race 391 is rotatable around the central axis of the inner race 391. The central axis of the inner race 391 is matched with the second axis Z2. The second axis Z2 is inclined by a predetermined inclination angle with respect to the first axis Z1, and as described later, oscillates while being inclined with respect to the first axis Z1.

The inner race 391 is supported rotatably on the outer race 392 via the rolling elements 393, and accordingly, it is rotatable around the second axis Z2. The inner race 391 is rotatable around the first axis Z1 according to driving of a transmission ratio variable mechanism motor 23 that is an electric motor as an actuator for driving the outer race 392. The inner race 391 and the outer race 392 can coriolis-move (neutates) around the first axis Z1.

The transmission ratio variable mechanism motor 23 is disposed on the radially outer side of the bearing ring unit 39. The central axis of the transmission ratio variable mechanism motor 23 is matched with the first axis Z1. The transmission ratio variable mechanism motor 23 varies the transmission ratio $\theta 2/\theta 1$ by varying the speed of rotation of the outer race 392 around the first axis Z1.

The transmission ratio variable mechanism motor 23 is, for example, a brushless motor, and includes a rotor 231 that holds the outer race 392 of the bearing ring unit 39, and a stator 232 that surrounds the rotor 231 and is fixed to a housing 24 as a steering column. The rotor 231 rotates around the first axis Z1.

The motor vehicle steering system 1 includes a steering-assist-force imparting mechanism 19 for imparting a steering assist force to the steering shaft 3. The steering-assist-force imparting mechanism 19 includes the second shaft 12 as an input shaft linked to the output member 22 of the transmission ratio variable mechanism 5, the third shaft 13 as an output shaft linked to the turning mechanism 10, a torque sensor 44 described later that detects a torque transmitted between the second shaft 12 and the third shaft 13, a steering assisting motor 25 as a steering assisting actuator, and a reduction gear mechanism 26 interposed between the steering assisting motor 25 and the third shaft 13.

The steering assisting motor 25 is an electric motor such as a brushless motor. An output of this steering assisting motor 25 is transmitted to the third shaft 13 via the reduction gear mechanism 26.

The reduction gear mechanism 26 is, for example, a worm gear mechanism. The reduction gear mechanism 26 includes a worm shaft 27 as a drive gear piece coupled to an output shaft 25a of the steering assisting motor 25, and a worm wheel 28 as a driven gear piece that is engaged with the worm shaft 27 and coupled to the third shaft 13 rotatably together. The reduction gear mechanism 26 is not limited to a worm gear mechanism, and other gear mechanisms such as a parallel shaft gear mechanism may also be used. The above-described parallel shaft gear mechanism includes, for example, a pair of spur gear pieces that engage with each other, and helical gear pieces may be used instead of spur gear pieces.

The transmission ratio variable mechanism 5 and the steering-assist-force imparting mechanism 19 are disposed in the housing 24. The housing 24 is disposed in a cabin of the motor vehicle. The housing 24 may be disposed so as to surround the intermediate shaft 8, or may be disposed in the engine room of the motor vehicle.

Drives of the transmission ratio variable mechanism motor 23 and the steering assisting motor 25, respectively, are controlled by a controller 29 including a CPU, a RAM, and a ROM. The controller 29 is connected to the transmission ratio variable mechanism motor 23 via a driving circuit 40, and connected to the steering assisting motor 25 via a driving circuit 41.

The controller 29 is connected to a steering angle sensor 42, a rotation angle detection sensor 43 that is a motor resolver for detecting a rotation angle of the transmission ratio variable mechanism motor 23, a torque sensor 44 as a torque detector, a superimposed angle sensor 45, a vehicle speed sensor 46, and a yaw rate sensor 47.

From the steering angle sensor 42 to the controller 29, a signal concerning a rotation angle of the first shaft 11 is input as a value corresponding to a steering angle θ1 as an operation amount from a neutral position of the steering member 2.

From the rotation angle detection sensor 43 to the controller 29, a signal concerning a rotation angle θr of the rotor 231 of the transmission ratio variable mechanism motor 23 is input.

From the torque sensor 44 to the controller 29, a signal concerning a torque applied between the second and third shafts 12 and 13 is input as a value corresponding to a steering torque T to be applied to the steering member 2.

From the superimposed angle sensor 45 to the controller 29, a signal concerning a rotation angle θ2 (output superimposed angle by the transmission ratio variable mechanism 5) of the third shaft 13 is input as a value corresponding to the steered angle of the steered wheels 4R and 4L.

From the vehicle speed sensor 48 to the controller 29, a signal concerning a vehicle speed V is input.

From the yaw rate sensor 47 to the controller 29, a signal concerning a yaw rate λ of the motor vehicle is input.

The controller 29 controls drives of the transmission ratio variable mechanism motor 23 and the steering assisting motor 25 based on the signals, etc., of the sensors 42 to 47 described above.

With the above-described arrangement, the output of the transmission ratio variable mechanism 5 is transmitted to the turning mechanism 10 via the steering-assist-force imparting mechanism 19. In more detail, the steering torque input into the steering member 2 is input into the input member 20 of the transmission ratio variable mechanism 5 via the first shaft 11, and transmitted from the output member 22 to the second shaft 12 of the steering-assist-force imparting mechanism 19.

The steering torque transmitted to the second shaft 12 is transmitted to the torsion bar 14 and the third shaft 13, and transmitted to the turning mechanism 10 via the intermediate shaft 8, etc., together with an output from the steering assisting motor 25.

Figure 2:
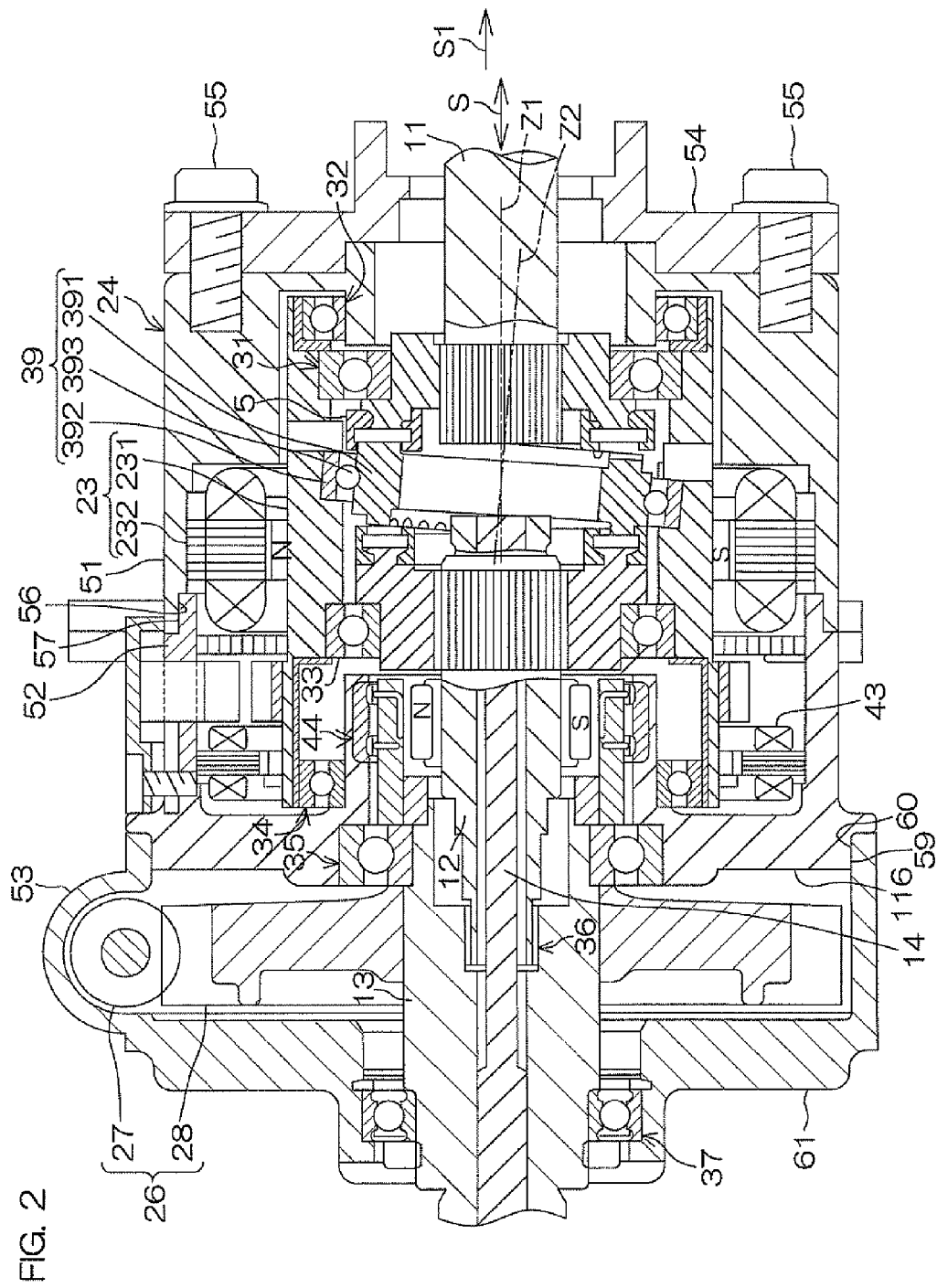
FIG. 2 is a sectional view showing a more detailed arrangement of an essential portion of FIG. 1.

FIG. 2 is a sectional view showing a more detailed arrangement of an essential portion of FIG. 1. Referring to FIG. 2, the housing 24 is formed by shaping metal such as aluminum alloy into a tubular shape, for example, and includes a first housing 51, a second housing 52, and a third housing 53. Inside the housing 24, a first bearing 31, a second bearing 32, a third bearing 33, a fourth bearing 34, a fifth bearing 35, a sixth bearing 36, and a seventh bearing 37 (simply shown) are housed. For example, the first to seventh bearings 31 to 37 are rolling bearings respectively. In more detail, the first to fifth bearings 31 to 35 and the seventh bearing 37 are angular contact ball bearings respectively. The sixth bearing 36 is a needle roller bearing.

The first housing 51 has a tubular shape, and constitutes a differential mechanism housing for housing the transmission ratio variable mechanism 5 as a differential mechanism, and constitutes a motor housing for housing the transmission ratio variable mechanism motor 23. One end of the first housing 51 is covered by an end wall member 54. One end of the first housing 51 and the end wall member 54 are fixed to each other by using fastening members 55 such as bolts. An annular protruding portion 57 on one end of the second housing 52 is fitted into the inner peripheral surface 56 on the other end of the first housing 51. These first and second housings 51 and 52 are fixed to each other by using a fastening member (not shown) such as a bolt.

The second housing 52 has a tubular shape, and constitutes a sensor housing for housing the torque sensor 44 and a resolver housing for housing the rotation angle detection sensor 43. The outer peripheral surface 59 on the other end of the second housing 52 is fitted into the inner peripheral surface 60 on one end of the third housing 53.

The third housing 53 has a tubular shape, and constitutes a reduction gear mechanism housing for housing the reduction gear mechanism 26. On the other end of the third housing 53, an end wall portion 61 is provided. The end wall portion 61 has an annular shape. The other end of the third housing 53 is closed by the end wall portion 61.

Figure 3:
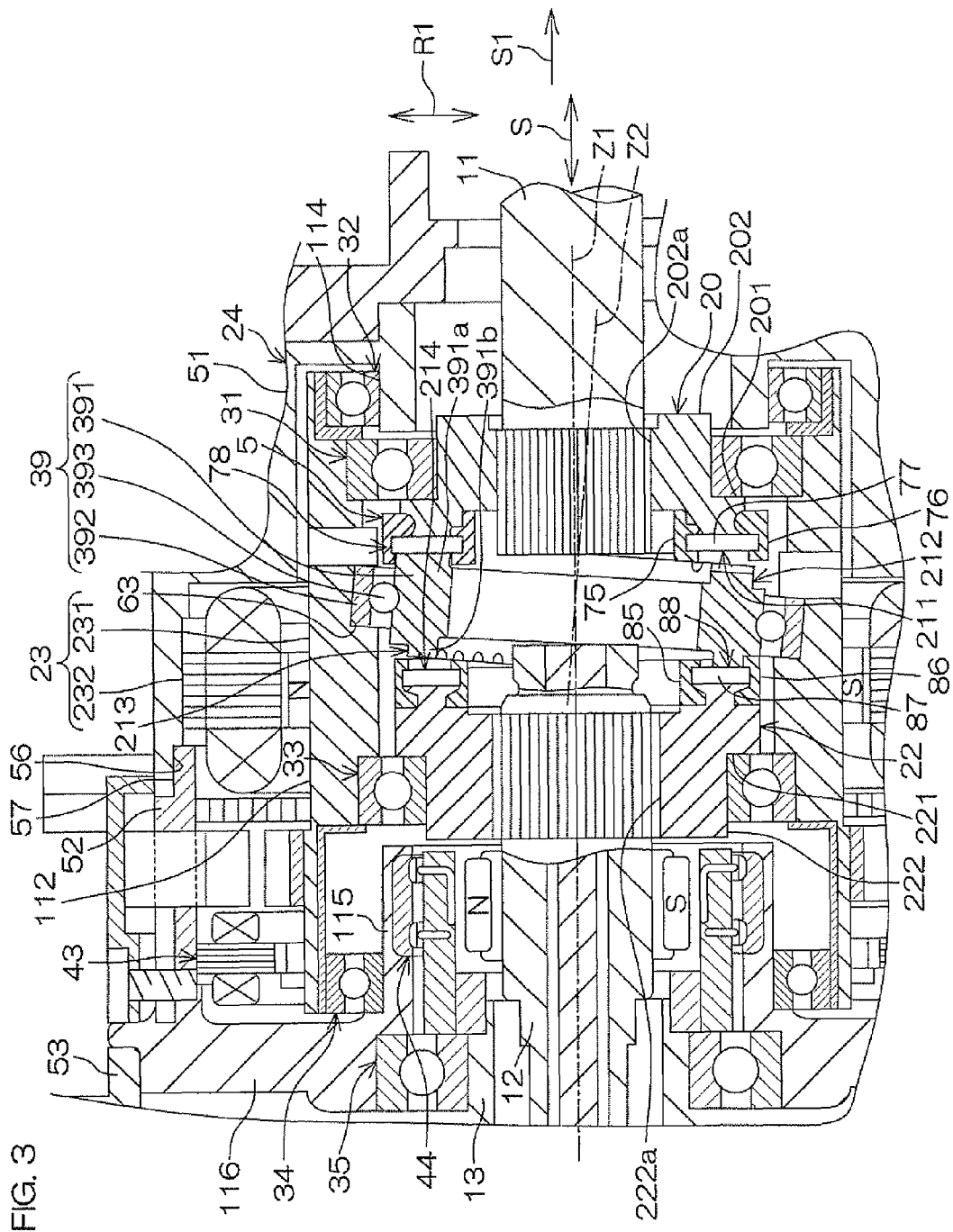
FIG. 3 is an enlarged view of the transmission ratio variable mechanism of FIG. 2 and a surrounding area thereof.

FIG. 3 is an enlarged view of the transmission ratio variable mechanism 5 of FIG. 2 and the surrounding area thereof. Referring to FIG. 3, the respective input member 20 and the output member 22 of the transmission ratio variable mechanism 5 and inner race 391 of the bearing ring unit 39 are annular.

The input member 20 and the inner race 391 are coupled to each other so as to transmit power by a first gear piece 211 and a second gear piece 212 that engage with each other. The inner race 391 and the output member 22 are coupled to each other so as to transmit power by a third gear piece 213 and a fourth gear piece 214 that engage with each other.

The input member 20 has the first gear piece 211. The first gear piece 211 includes an input member main body 201 as a gear main body, a plurality of pins 77 held on the input member main body 201, and an inner retainer 75 and an outer retainer 76 for holding the plurality of pins 77 on the input member main body 201.

The input member 20 has a tubular member 202 that is disposed on the radially inner side of the input member main body 201 and rotatable integrally with the input member main body 201. The input member main body 201 and the tubular member 202 are formed integrally by using a single material.

The other end of the first shaft 11 is inserted through an insertion hole 202a of the tubular member 202. The other end of the first shaft 11 as an input shaft 11 of the transmission ratio variable mechanism 5 and the tubular member 202 are coupled so as to transmit a torque by, for example, serration engagement.

The output member 22 has a fourth gear piece 214. The fourth gear piece 214 includes an output member main body 221 as a gear main body, a plurality of pins 87 held on the output member main body 221, and an inner retainer 85 and an outer retainer 86 for holding the plurality of pins 87 on the output member main body 221.

The output member 22 has a tubular member 222 that is disposed on the radially-inner side of the output member main body 221 and is rotatable integrally with the output member main body 221. The output member main body 221 and the tubular member 222 are formed integrally by using a single material.

One end of the second shaft 12 is inserted through an insertion hole 222a of the tubular member 222 of the output member 22. An intermediate portion of the second shaft 12 as an output shaft of the transmission ratio variable mechanism 5 and the output member 22 are coupled so as to transmit a torque by, for example, serration engagement.

The entire inner race 391 of the bearing ring unit 39 is formed integrally by using a single member, and disposed between the input member 20 and the output member 22. The inner race 391 has a second gear piece 212 paired with the first gear piece 211 of the input member 20, and a third gear piece 213 paired with the fourth gear piece 214 of the output member 22. The inner race 391 has a first end portion 391a and a second end portion 391b in the axial direction of the inner race 391. The first end portion 391a is formed as a gear main body of the second gear piece 212. The second end portion 391b is formed as a gear main body of the third gear piece 213. The first and second end portions 391a and 391b have axes matched with each other, and are integrally rotatable around the second axis Z2 as the matched axis.

The outer race 392 is fixed to an inclined hole 63 formed in the inner periphery of the rotor 231 of the transmission ratio variable mechanism motor 23 by press fitting. The outer race 392 rotates around the first axis Z1 integrally with the rotor 231. According to rotation of the rotor 231 around the first axis Z1, the bearing ring unit 39 coriolis-moves.

In the embodiment, description is given by using the bearing ring unit 39 arranged as described above, however, the following arrangement is also possible. That is, the outer race 392 couples the input member 20 and the output member 22 differentially rotatably, and the inner race 391 may be coupled to the rotor 231 of the transmission ratio variable mechanism motor 23 rotatably. In this case, the bearing ring unit 39 is an inner race support type. The second gear piece 212 and the third gear piece 213 are provided on the side surface of the outer race 392 as an intermediate member.

Figure 4:
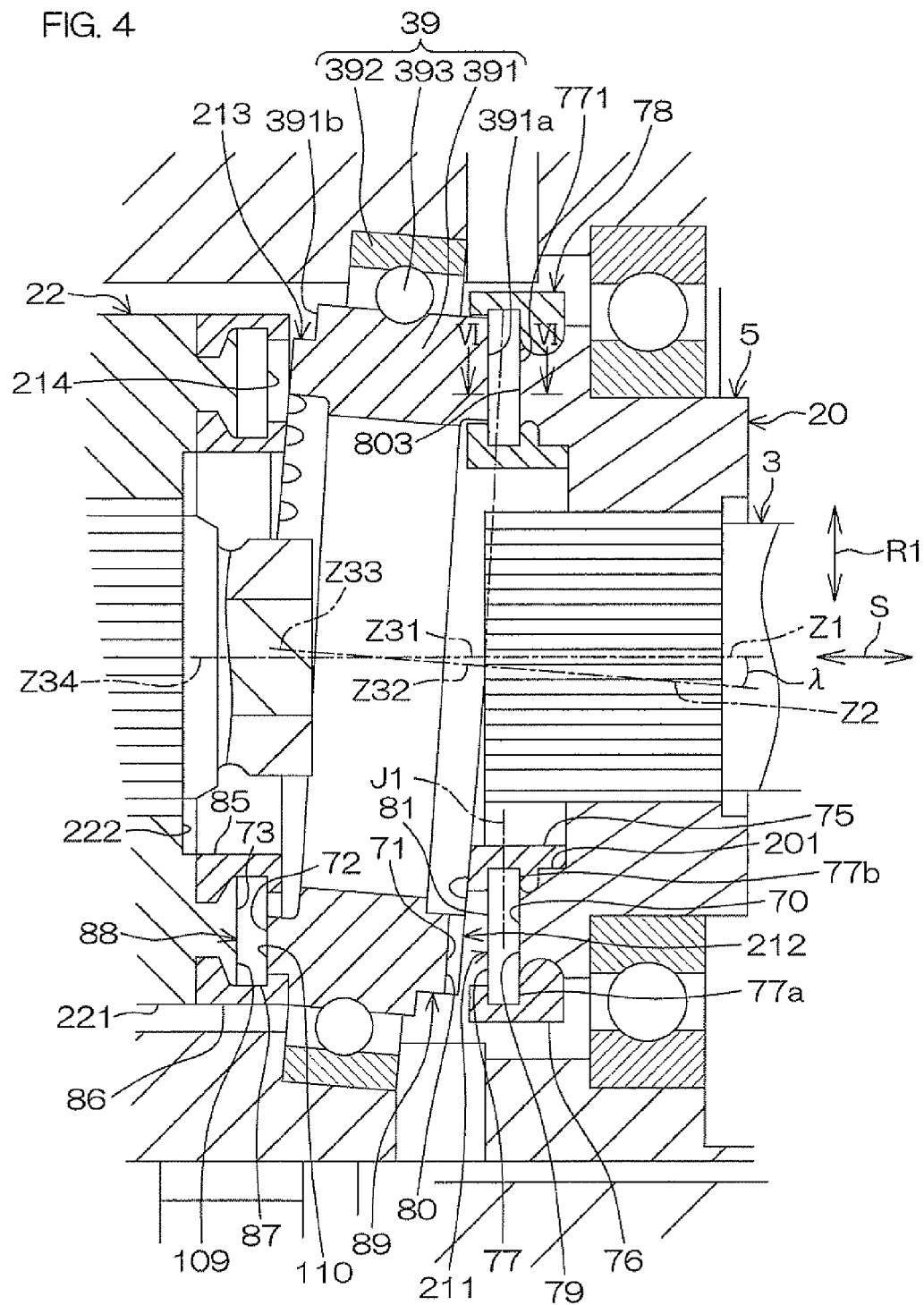
FIG. 4 is an enlarged view of an essential portion of the transmission ratio variable mechanism of FIG. 3.

FIG. 4 is an enlarged view of an essential portion of the transmission ratio variable mechanism 5 of FIG. 3. Referring to FIG. 4, the central axis Z31 of the first gear piece 211 is matched with the central axis of the input member 20, and also matched with the first axis Z1. The first gear piece 211 is rotatable around the central axis Z31 of the first gear piece 211.

The central axis Z34 of the fourth gear piece 214 is matched with the central axis of the output member 22, and also matched with the first axis Z1. The fourth gear piece 214 is rotatable around the central axis Z34 of the fourth gear piece 214.

The central axis Z32 of the second gear piece 212 is matched with the second axis Z2. The second gear piece 212 is rotatable around the central axis Z32 of the second gear piece 212.

The central axis Z33 of the third gear piece 213 is matched with the second axis Z2. The third gear piece 213 is rotatable around the central axis Z33 of the third gear piece 213.

The second gear piece 212 and the third gear piece 213 rotate around the central axis Z32 and the central axis Z33 that are inclined with respect to the first axis Z1. Therefore, the second gear piece 212 and the third gear piece 213 are also referred to as axially oscillating gear pieces.

On the other hand, the central axis Z31 of the first gear piece 211 and the central axis Z34 of the fourth gear piece 214 neither rotate nor are displaced. Therefore, the first gear piece 211 and the fourth gear piece 214 are also referred to as axially fixed gear pieces.

The first gear piece 211 and the second gear piece 212 that engage with the first gear piece 211 so as to transmit power constitute a first oscillating gear device 78. The third gear piece 213 and the fourth gear piece 214 that engage with the third gear piece 213 so as to transmit power constitute a second oscillating gear device 88. The first oscillating gear device 78 and the second oscillating gear device 88 forms a third oscillating gear device 89.

The input member 20 and the output member 22 of the third oscillating gear device 89 have central axes that are matched with each other, and are disposed across the first end portion 391a and the second end portion 391b of the inner race 391.

The first gear piece 211 has a side surface 70. The side surface 70 is provided on an axial end portion of the input member 20. The fourth gear piece 214 has a side surface 73. The side surface 73 is provided on an axial end portion of the output member 22.

The inner race 391 has a side surface 71 of the second gear piece 212 and a side surface 72 of the third gear piece 213. The side surface 71 of the second gear piece 212 and the side surface 72 of the third gear piece 213 are opposed to each other in the axial direction of the inner race 391. The side surface 71 of the second gear piece 212 is formed as a part of the first end portion 391a of the inner race 391, and faces to the side surface 70 of the first gear piece 211. The side surface 72 of the third gear piece 213 is formed as a part of the second end portion 391b of the inner race 391, and faces to the side surface 73 of the fourth gear piece 214.

Figure 5:
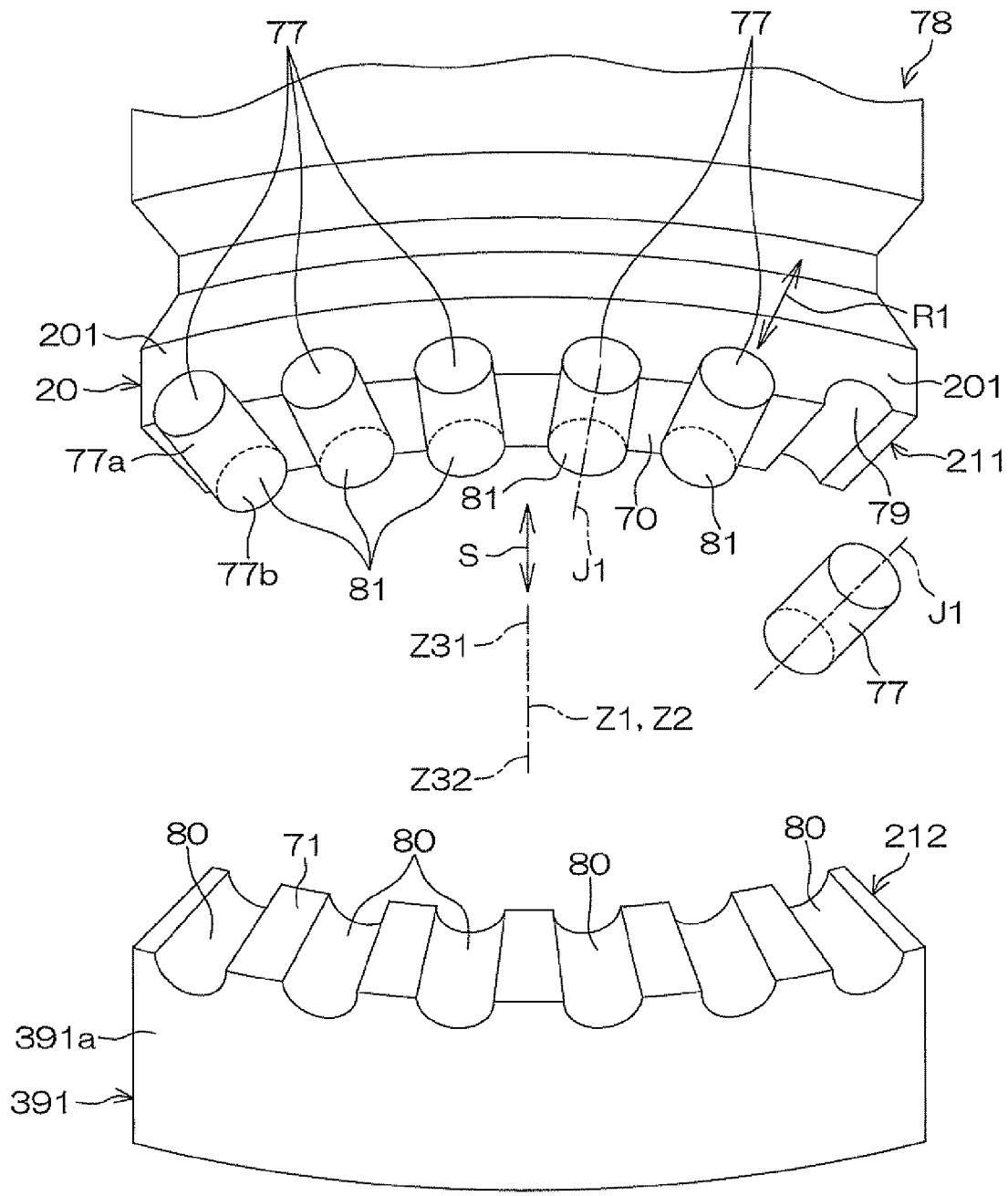
FIG. 5 is a perspective view of an essential portion of a first oscillating gear device.

FIG. 5 is a perspective view of an essential portion of the first oscillating gear device 78. Referring to FIG. 4 and FIG. 5, the first gear piece 211 has a plurality of holding grooves 79 formed on the side surface 70 of the first gear piece 211, and a plurality of pins 77 held in the holding grooves 79.

The second gear piece 212 includes a plurality of tooth grooves 80 that are formed on the side surface 71 of the second gear piece 212 and engage with the corresponding pins 77. The tooth grooves 80 and the pins 77 can engage with each other.

The holding grooves 79 and the pins 77 are disposed at even intervals on the side surface 70 in the circumferential direction of the input member 20 across the entire region in the circumferential direction of the input member 20.

The tooth grooves 80 are disposed at even intervals on the side surface 71 in the circumferential direction of the inner race 391 across the entire region in the circumferential direction of the inner race 391.

The disposed numbers of holding grooves 79 and pins 77, respectively, are, for example, 38. The number of tooth grooves 80 is set to a number different from the number of pins 77, for example, to 40 that is a number larger than the number of pins 77. The number of teeth of the axially fixed gear piece is smaller than the number of teeth of the axially oscillating gear piece.

Each pin 77 is for forming a tooth 81 of the first gear piece 211, and is, for example, a needle roller having a columnar shape. The pins 77 are disposed radially around the central axis Z31 of the first gear piece 211. The half portion of each pin 77 projects from the corresponding holding groove 79 and has a semicircular sectional shape. This projecting half portion serves as the tooth 81 of the first gear piece 211. The outer ends 77a of the pins 77 in the radial direction R1 of the first gear piece 211 are collectively held by the annular outer retainer 76, and inner ends 77b in the radial direction R1 of the first gear piece 211 are collectively held by the annular inner retainer 75.

The pins 77 are held by these outer retainer 76 and inner retainer 75 in a state in which they are in contact with the holding grooves 79 of the input member main body 201. The outer retainer 76 and the inner retainer 75 are made of a material with elasticity, for example, synthetic resin, and are attached to the input member main body 201.

Referring to FIG. 5, the holding grooves 79 are formed to be thin and long radially around the central axis Z31 of the first gear piece 211, and extend to the entire region of the side surface 70 in the radial direction of the first gear piece 211, and are disposed at even intervals in the circumferential direction of the first gear piece 211. The number of holding grooves 79 is set equal to the number of pins 77, and the pins 77 are held in the holding grooves 79. The inner retainer 75 and the outer retainer 76 are not shown in FIG. 5.

The tooth grooves 80 are formed to be narrow and long radially around the central axis Z32 of the second gear piece 212, and extend to the entire region of the side surface 71 in the radial direction of the second gear piece 212 (radial direction of the inner race 391 as well), and are disposed at even intervals in the circumferential direction of the second gear piece 212. The number of tooth grooves 80 is set to a number different from the number of pins 77. According to the difference between the number of pins 77 and the number of tooth grooves 80, speed changing can be performed between the input member main body 201 and the inner race 391.

Referring to FIG. 4 again, the second axis Z2 of the inner race 391 is inclined by a predetermined angle λ with respect to the first axis Z1 of the input member 20, and accordingly, some of the plurality of pins 77 of the first gear piece 211 and some of the plurality of tooth grooves 80 of the second gear piece 212 engage with each other.

Figure 6:
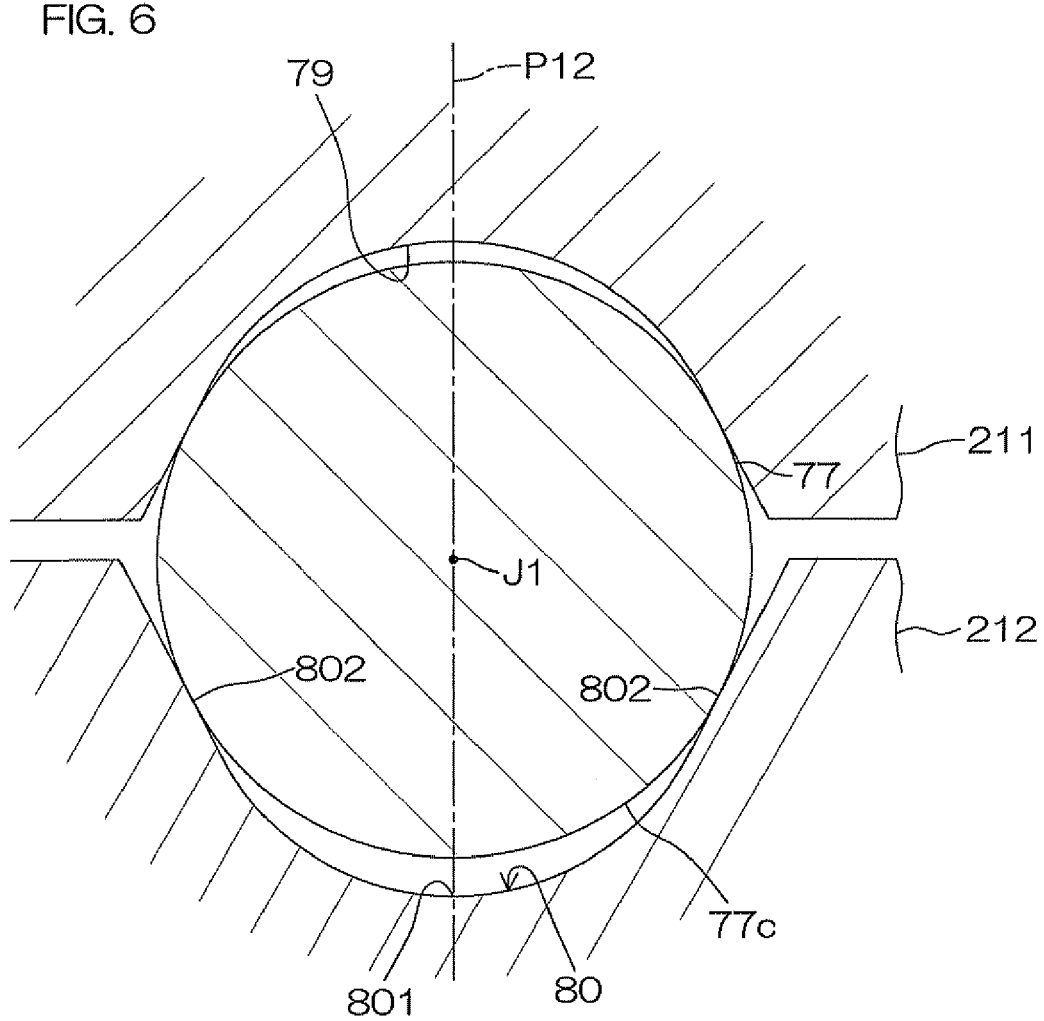
FIG. 6 is a sectional view of an essential portion along the VI-VI line of FIG. 4.

FIG. 6 is a sectional view of an essential portion along the VI-VI line of FIG. 4. FIG. 6 shows a section orthogonal to the longitudinal direction of the pin 77 engaging with the tooth groove 80. Referring to FIG. 5 and FIG. 6, the outer peripheral surface of the pin 77 is formed by a cylindrical surface. In the direction along the central axis J1 of the pin 77, the diameter of the outer peripheral surface of the pin 77 is fixed.

The tooth groove 80 extends in a gutter shape having a curved recess cross sectional shape. In the section orthogonal to the central axis of the pin 77, the inner surface of the tooth groove 80 has, for example, a so-called gothic arch shape. The bottom 801 of the tooth groove 80 is sharp-pointed. The bottom 801 of the tooth groove 80 and the pin 77 are arranged so as not to come into contact with each other. The sectional shape of the tooth groove 80 is the same across the entire region in the longitudinal direction of the tooth groove 80. The tooth groove 80 includes a pair of contact portions 802 arranged in line in the circumferential direction of the second gear piece 212 across the bottom 801. When the projecting top the pin 77 reaches the deepest point of the tooth groove 80, the pair of contact portions 802 can come into contact with the outer peripheral surface of the pin 77. Each contact portion 802 is formed by an arc surface. The radius of curvature of this arc surface is larger than the radius of the outer peripheral surface of the pin 77.

Referring to FIG. 4, the third gear piece 213 is arranged similar to the second gear piece 212 except for the following point. The fourth gear piece 214 is arranged similar to the first gear piece 211 except for the following point. That is, the fourth gear piece 214 is provided on the outer member 22. The third gear piece 213 is provided on the second end portion 319b of the inner race 391. The number-of-teeth difference between the third gear piece 213 and the fourth gear piece 214 is different from the number-of-teeth difference between the first gear piece 211 and the second gear piece 212. For example, in the embodiment, the number-of-teeth difference between the first gear piece 211 and the second gear piece 212 is set to be larger than the number-of-teeth difference between the third gear piece 213 and the fourth gear piece 214, however, this may be reversed.

The side surface 72 of the third gear piece 213 has a plurality of tooth grooves 110. The tooth grooves 110 are formed similar to the above-described tooth grooves 80.

The side surface 73 of the fourth gear piece 214 has a plurality of holding grooves 109, a plurality of pins 87, and an inner retainer 85 and an outer retainer 86 for holding the pins 87. The holding grooves 109 are arranged similar to the holding grooves 79 of the first gear piece 211. The pins 87 are arranged similar to the pins 77 of the first gear piece 211. The inner retainer 85 and the outer retainer 86 are arranged similar to the inner retainer 75 and the outer retainer 76.

The engaged state between the third gear piece 213 and the fourth gear piece 214 is the same as that between the first gear piece 211 and the second gear piece 212. The same operation and effect as those obtained by the relationship between the first gear piece 211 and the second gear piece 212 can also be obtained by the third gear piece 213 and the fourth gear piece 214 although detailed description of the third gear piece 213 and the fourth gear piece 214 is omitted. Hereinafter, description is given about the relationship between the first gear piece 211 and the second gear piece 212.

Referring to FIG. 3, the rotor 231 of the transmission ratio variable mechanism motor 23 includes a tubular rotor core 112 extending in the axial direction S.

In the embodiment, the rotor core 112 supporting the outer race 392 of the bearing ring unit 39 supports the tubular member 202 of the input member 20 rotatably via the first bearing 31, and supports the tubular member 222 of the output member 22 rotatably via the third bearing 33. The outer race of the first bearing 31 is positioned in the axial direction by a stepped portion of the rotor core 112. The outer race of the third bearing 33 is positioned in the axial direction by a stepped portion of the rotor core 112. The outer race 392 of the bearing ring unit 39 is positioned in the axial direction by a stepped portion of the rotor core 112. Accordingly, the outer race 392, the input member 20, and the output member 22 are restricted from moving in the axial directions relative to each other.

The rotor core 112 is supported at both ends by the second and fourth bearings 32 and 34 sandwiching the first and third bearings 31 and 33 in the axial direction S.

The second bearing 32 is held by an annular protruding portion 114 formed on the inner diameter portion on one end of the first housing 51. The fourth bearing 34 is held by an annular extending portion 115 formed on the inner diameter portion on the other end of the second housing 52.

The annular extending portion 115 has a tubular shape extending from a partitioning wall portion 116 provided on the other end of the second housing 52 to one side S1 of the axial direction S, and is inserted into the rotor core 112.

Figure 7:
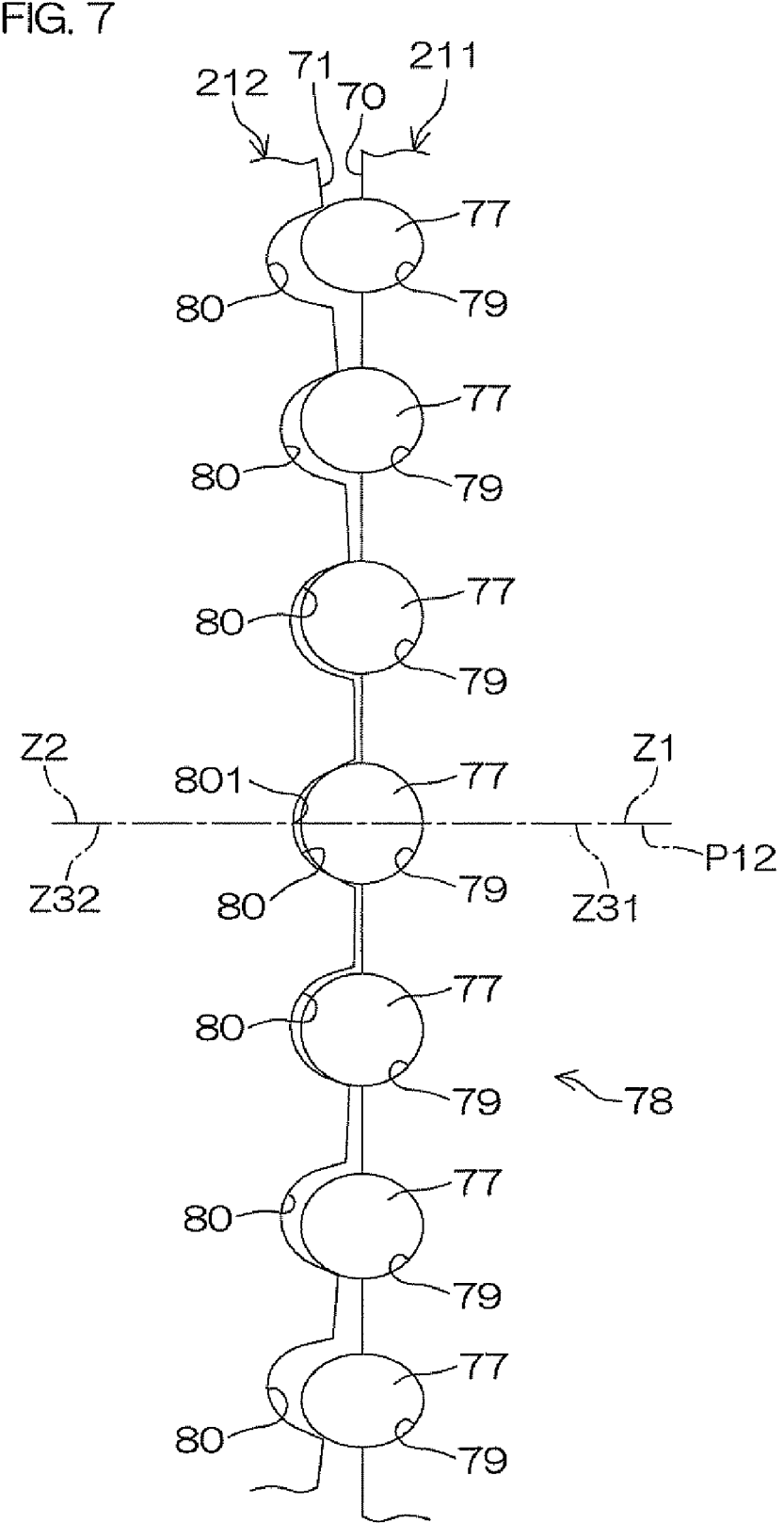
FIG. 7 is a side view of the first oscillating gear device.

FIG. 7 is a side view of the first oscillating gear device 78. Referring to FIG. 7, a plurality of pins 77 of the first gear piece 211 and a plurality of tooth grooves 80 of the second gear piece 212 are simultaneously engaged with each other. On the other hand, a plurality of pairs of pins 77 and tooth grooves 80 are simultaneously engaged with each other, so that the pins 77 and the tooth grooves 80 easily interfere with each other. When this interference occurs, vibration and noise occur in the circumferential direction.

In the embodiment, in order to suppress the above-described interference, the first oscillating gear device 78 is arranged to satisfy the following formula (1).

The second oscillating gear device 88 is also arranged to satisfy the formula (1). In the third oscillating gear device 89, it is preferable that both of the first and second oscillating gear devices 78 and 88 satisfy the formula (1), however, it is also allowed that either the first or second oscillating gear device 78 or 88 satisfies the formula (1). Hereinafter, description is given about the first oscillating gear device 78.

Figure 8:
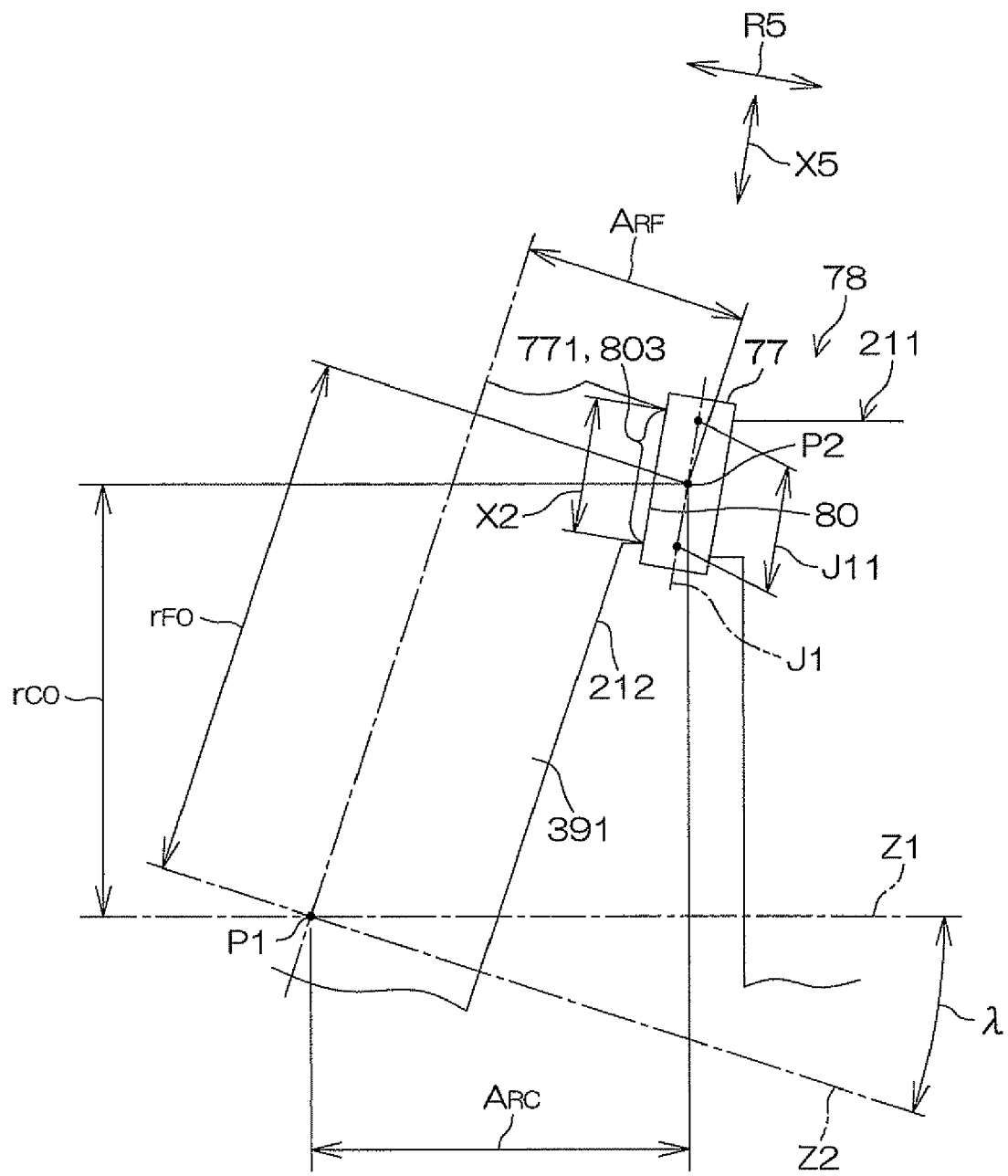
FIG. 8 is a schematic view of the first oscillating gear device.

FIG. 8 is a schematic view of the first oscillating gear device 78. Referring to FIG. 8, in the first oscillating gear device 78, the pin 77 and tooth groove 80 engage with each other in the engagement regions 771, 803 at a predetermined length X2 in the longitudinal direction X5 of the pin 77. The engagement region 771 is on the outer peripheral surface of the pin 77. The engagement region 803 is on the inner surface of the tooth groove 80.

The central axis J1 of the pin 77 includes a corresponding section J11 corresponding to the engagement regions 771, 803 in the radial direction R5 of the pin 77. When the distance between an arbitrary point P2 on the central axis J1 of the pin 77 within the corresponding section J11 and the first axis Z1 is $r_{C0}$, the distance between the arbitrary point P2 and the second axis Z2 is $r_{F0}$, the number of pins 77 of the first gear piece 211 is $Z_C$, and the number of tooth grooves 80 of the second gear piece 212 is $Z_F$, the following formula (1): $r_{C0}/r_{F0}=Z_C/Z_F \ldots$ (1) is satisfied.

According to the embodiment, when the first gear piece 211 as one of the above-described gear pieces and the second gear piece 212 as the other gear piece engage with each other and rotate, in the three-dimensional oscillatory movement of the pin 77, the amount of oscillatory movement around the axis parallel to the central axis J1 of the pin 77 becomes smaller. Therefore, vibration when the pin 77 goes in and comes out of the tooth groove 80 becomes smaller. As a result, vibration and noise of the first oscillating gear device 78 can be suppressed.

The distance $r_{C0}$ in the formula (1) may be an actually measured value or a calculated value obtained through calculation using an actually measured value or a target value. The same applies to the distance $r_{F0}$. From these distances $r_{C0}$ and $r_{F0}$, the r ratio (r ratio=$r_{C0}/r_{F0}$) of the left-hand side of the formula (1) is calculated, and it is satisfactory that the calculated r ratio becomes equal to the number-of-teeth ratio. When the ratios are equal to each other, the formula (1) is satisfied.

For example, when the angle between the first axis Z1 and the second axis Z2 is λ, the distance between the intersection P1 of the first axis Z1 and the second axis Z2 and the arbitrary point P2 in the extending direction of the first axis Z1 is $A_{RC}$, and the distance between the intersection P1 and the arbitrary point P2 in the extending direction of the second axis Z2 is $A_{RF}$, the following formulas (2) and (3) are satisfied.

$$A_{RF}=A_{RC}\times\cos\lambda - r_{C0}\times\sin\lambda \quad (2)$$

$$r_{F0}=r_{C0}\times\cos\lambda - A_{RC}\times\sin\lambda \quad (3)$$

For example, as various factors (target values or measured values) of the first and second gear pieces 211 and 212 of the first oscillating gear device 78, the angle λ, the distance $r_{C0}$, and the distance $A_{RF}$ (or distance $A_{RC}$) are given in some cases. In this case, by using the formulas (2) and (3) and the given factors, that is, the angle λ, the distance $r_{C0}$, and the distance $A_{RF}$ (or distance $A_{RC}$), the distance $r_{F0}$ can be obtained, and further, the r ratio of the left-hand side of the formula (1) can be obtained.

For example, the above-described arbitrary point P2 is included on a plane P12 (see FIG. 6) including both the first axis Z1 and the second axis Z2. In more detail, the arbitrary point P2 is disposed at the central position of the corresponding section J11 on the central axis J1 of the pin 77. In this case, vibration can be effectively suppressed.

When the formula (1) is satisfied, the pitch of the pins 77 of the first gear piece 211 measured along the circle that passes through the arbitrary point P2 and is around the first axis Z1, and the pitch of the tooth grooves 80 of the second gear piece 212 measured along the circle that passes through the arbitrary point P2 and is around the second axis Z2 become equal to each other.

In other words, by setting the various factors (for example, the distance $r_{C0}$ and the distance $r_{F0}$) such that the formula (1) is satisfied, the pitches of the teeth of the first gear piece 211 and the second gear piece 212 can be easily and reliably made equal to each other. Therefore, vibration and noise of the first oscillating gear device 78 can be reliably and easily reduced.

In conventional oscillating gear devices, the pitches of the teeth of the first and second gear pieces are not regarded as very important. As a result, for example, in the setting of the various factors as described above, the various factors are not set so as to satisfy the formula (1), so that the pitches of the teeth of the first and second gear pieces are different from each other. As a result, the above-described vibration and noise are brought about.

Further, an adoption may be possible of the pin shape or tooth groove shape that is capable of suppressing vibration. However, this shape is complicated and machining thereof is difficult and increases the manufacturing cost. On the other hand, in the embodiment, to suppress vibration, the various factors of the pair of gear pieces are set so as to satisfy the above-described formula (1), so that the pin shape and tooth groove shape can be simplified. Therefore, the manufacturing cost can be made low. Further, vibration and noise can be suppressed.

In the following, the effects obtained by satisfying the above-described formula (1) will be described in detail. Now, relative movement of specific pin 77 and tooth groove 80 that engage with each other is considered.

A locus of relative movement of the pin 77 with respect to the tooth groove 80 when the formula (1) is satisfied is obtained according to the formula (4) described later. A locus of relative movement of the pin with respect to the tooth groove when the formula (1) is not satisfied is obtained in the same manner.

Figure 9A:
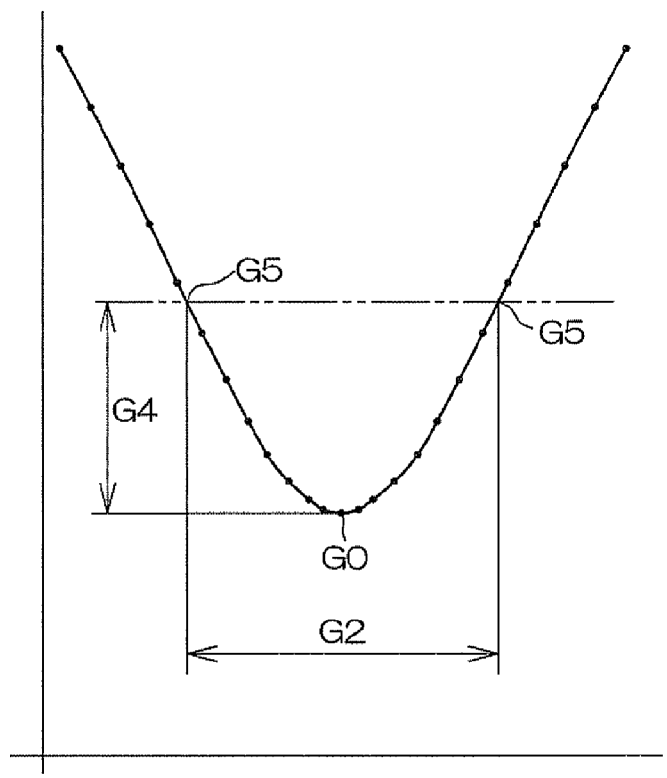
FIG. 9A is a graph showing a locus of relative movement of a pin and a tooth groove, showing a case in which the formula (1) is not satisfied. The horizontal axis indicates the relative movement of the pin with respect to the tooth groove in a direction of rotation of gears. The vertical axis indicates the relative movement of the pin with respect to the tooth groove in the depth direction of the tooth groove.
Figure 9B:
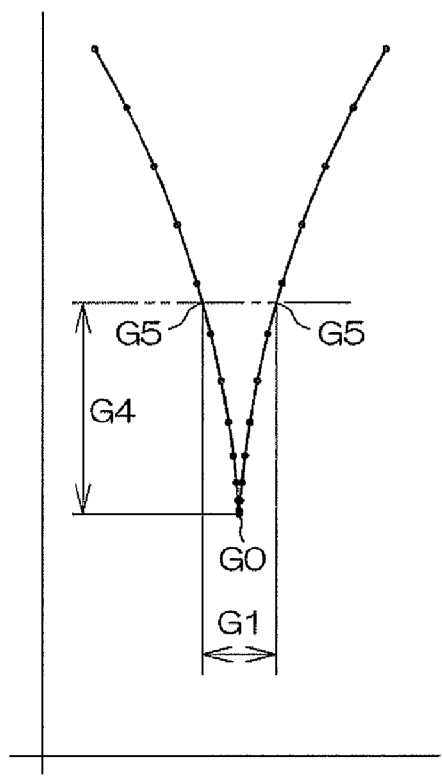
FIG. 9B is a graph showing a locus of relative movement of a pin and a tooth groove, showing a case in which the formula (1) is satisfied. The horizontal axis indicates the relative movement of the pin with respect to the tooth groove in a direction of rotation of gears. The vertical axis indicates the relative movement of the pin with respect to the tooth groove in the depth direction of the tooth groove.

FIG. 9A and FIG. 9B are graphs showing the results of calculation of the locus of the relative movement of the pin and the tooth groove. FIG. 9A shows a conventional case in which the formula (1) is not satisfied. FIG. 9B shows a case of the embodiment in which the formula (1) is satisfied. The horizontal axes of FIG. 9A and FIG. 9B show the amount of relative movement of the pin with respect to the tooth groove in the direction of rotation of the gear pieces. The vertical axes of FIG. 9A and FIG. 9B show the amount of relative movement of the pin with respect to the tooth groove in the depth direction of the tooth groove. In the graphs of FIG. 9A and FIG. 9B, the points showing the central positions of the pin with respect to the tooth groove are obtained through calculations, and the obtained points are connected by a line, and the central position of the pin when the center of the pin comes closest to the bottom of the tooth groove is shown as a point G0.

According to the graphs of FIG. 9A and FIG. 9B, when the pin 77 goes in and comes out of the corresponding tooth groove 80, the pin 77 makes relative movement in the depth direction (corresponding to the vertical direction of the graph) of the tooth groove 80, and makes relative movement in the direction of rotation (corresponding to the horizontal direction of the graph) of the first gear piece 211 (or the second gear piece 212).

When the formula (1) is satisfied (see FIG. 9B), the relative movement of the pin on the horizontal axis of the graph is relatively smaller than in the case in which the formula (1) is not satisfied (see FIG. 9A). In other words, it can be said that the relative displacement between the pin 77 and the tooth groove 80 in the direction of rotation is smaller.

Referring to FIG. 9B, when the pin 77 separates by a predetermined distance G4 in the depth direction of the tooth groove 80 from the point G0, the pin 77 and the tooth groove 80 are disengaged. There are two points G5 at which the pin 77 and the tooth groove 80 are disengaged. The distance G1 in the direction of rotation between the two points G5 is obtained. Similarly, referring to FIG. 9A, the distance G2 in the direction of rotation between the two points G5 is obtained.

As these distances G1 and G2 increase, vibration in the direction of rotation more easily occurs between the pin and the tooth groove that engage with each other. The distance G1 when the formula (1) is satisfied is smaller than the distance G2 when the formula (2) is not satisfied. Therefore, it can be said that vibration hardly occurs.

The formula (4) described later for calculating the graphs of FIG. 9A and FIG. 9B is for obtaining a position of an arbitrary point of the pin when the second gear piece 212 neutates in the case in which the first gear piece 211 has the tooth grooves and the second gear piece 212 has the pins in the oscillating gear device. The position of the above-described arbitrary point is given as a position of the point P5 that results from three rotational movements shown in FIG. 11 of the point P3 of FIG. 10. When the relative movement of the centers of the pin and the tooth groove is obtained, the pin and the tooth grove may be of any of the gear pieces.

Figure 10:
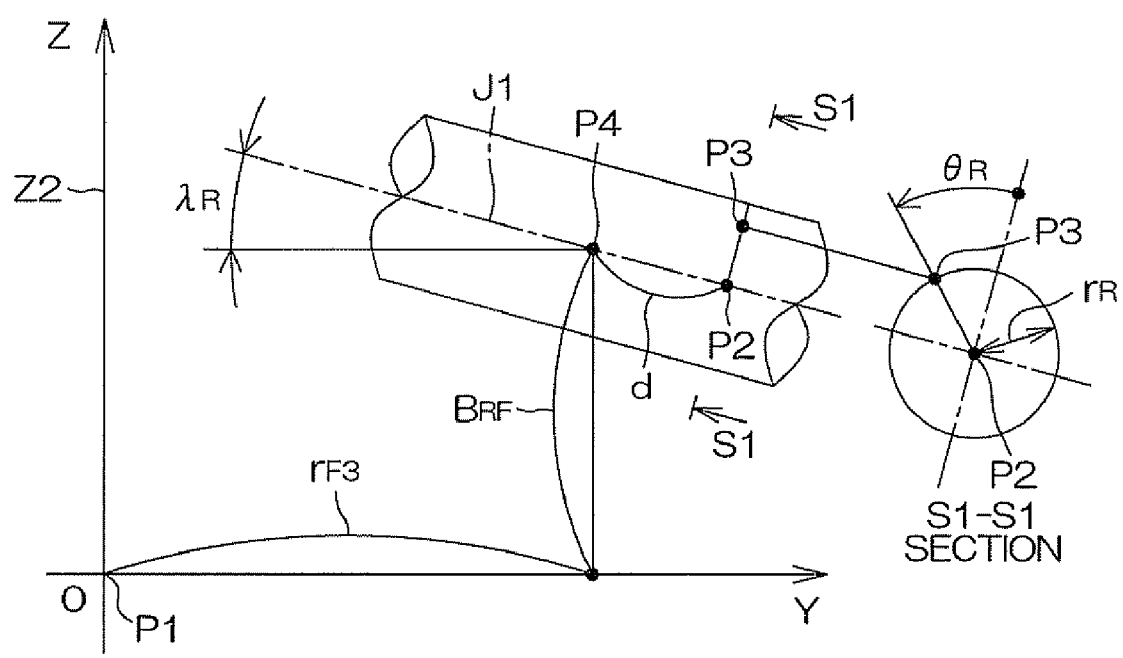
FIG. 10 is a schematic view of a second gear piece for describing the numerical formula.
Figure 11:
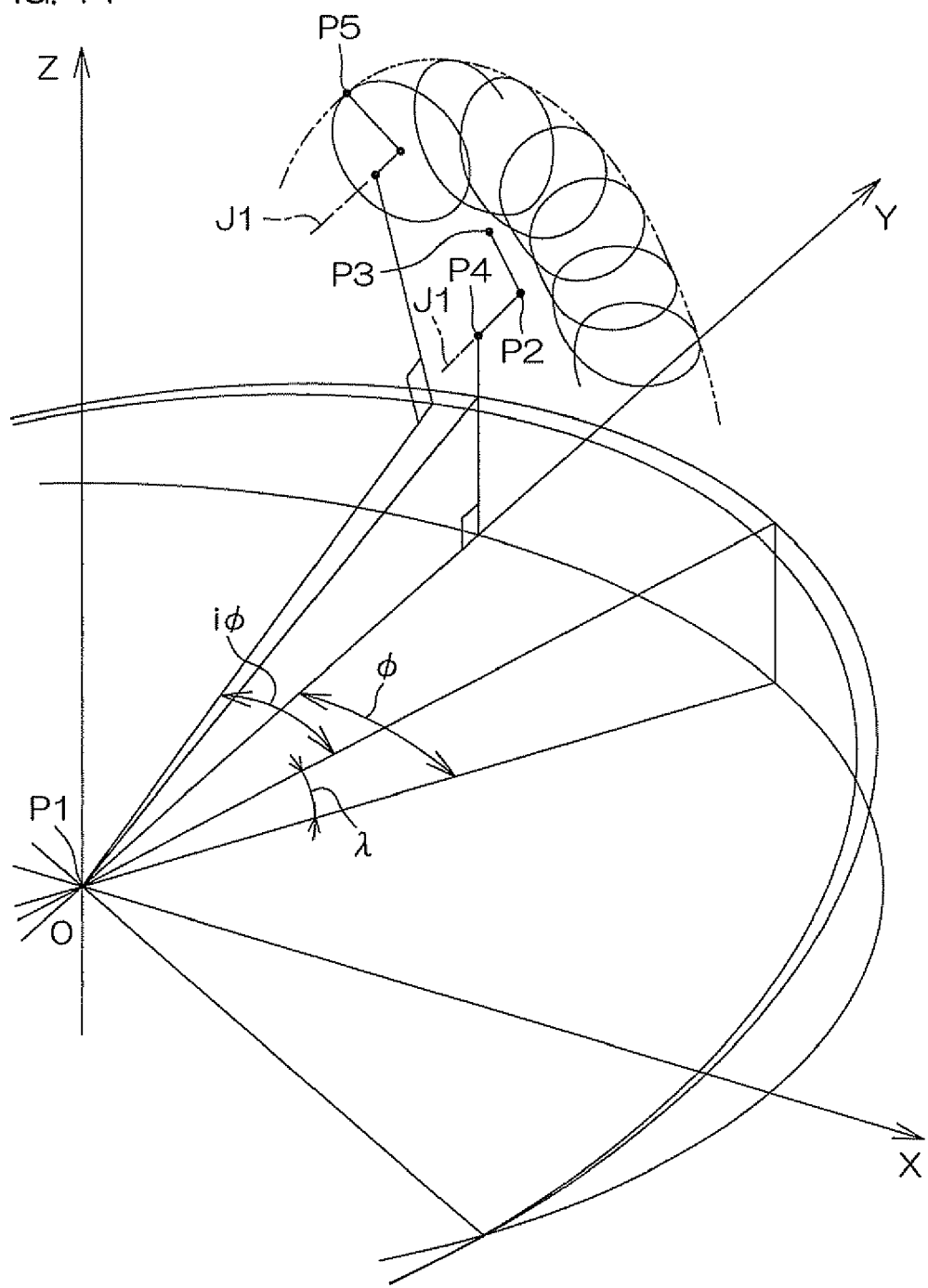
FIG. 11 is an explanatory view of a movement of a pin of a second gear piece of FIG. 10.

FIG. 10 is a schematic view of the second gear piece for describing the arbitrary point P3 of the pin of the second gear piece. FIG. 11 is an explanatory view of the movement of the pin of the second gear piece of FIG. 10. FIG. 11 shows the locus of the arbitrary point on the outer periphery of the pin when the second gear piece 212 neutates, and an envelope (shown as two-dot-and-dash lines) of this locus.

Referring to FIG. 10, the second axis Z2 is along the Z axis of the axis of coordinates. P3 is an arbitrary point of the pin of the second gear piece 212, and is shown when P3 is on the outer peripheral surface of the pin. $r_R$ is a variable for expressing the arbitrary point P3, and is the distance between the arbitrary point P3 and the central axis J1 of the pin. When the arbitrary point P3 is on the outer peripheral surface of the pin, the distance $r_R$ is equal to the radius of the outer peripheral surface of the pin. $\lambda_R$, is an angle of the central axis J1 of the pin with respect to the plane orthogonal to the second axis Z2. $\theta_R$ is a variable for expressing an arbitrary point P3, and is an angle of the pin around the central axis J1. d is a variable for expressing the arbitrary point P3, and is the distance between the center P4 of the pin and the point P3 in the direction along the central axis J1 of the pin. $r_{F3}$ is a distance between the center P4 of the pin on the central axis J1 of the pin and the second axis Z2. $B_{RF}$ is a distance between the intersection P1 and the center P4 of the pin in the extending direction of the second axis Z2.

Referring to FIG. 11, the three rotational movements from the arbitrary point P3 to the point P5 includes a rotation by an angle $-\Phi$ around the Z axis, a rotation by an angle $\lambda$, around the X axis, and a rotation by an angle $i\Phi$ around the Z axis. The position $P_{05}$ of the point P5 is obtained according to the following formula (4).

$$P_{05} = M_1 \cdot M_2 \cdot M_3 \cdot P_{03} \quad (4)$$

Here, $P_{03} = [X_0, Y_0, Z_0]$ $X_0 = r_R \cdot \sin \theta_R$ $Y_0 = d \cdot \cos \lambda_R + r_R \cdot \sin \lambda_R \cdot \cos \theta_R + r_{F3}$ $Z_0 = -d \cdot \sin \lambda_R + r_R \cdot \cos \lambda_R \cdot \cos \theta_R + B_{RF}$ $P_{03}$ is the position of the arbitrary point P3 of the pin, $X_0$ is the X coordinate of the point P3, $Y_0$ is the Y coordinate of the point P3, and $Z_0$ is the Z coordinate of the point P3. $M_1$ is a matrix for obtaining the position of the arbitrary point when the point is rotated by an angle of $-\Phi$ around the Z axis, and is a function of $\Phi$. $M_2$ is a matrix for obtaining the position of the arbitrary point when the point is rotated by an angle of $\lambda$ around the X axis, and is a function of $\lambda$. $M_3$ is a matrix for obtaining the position of the arbitrary point when the point is rotated by an angle of $i\Phi$ around the Z axis, and is a function of $i\Phi$.

$\Phi$ is a rotation angle of neutation of the second gear piece 212, and i is a number-of-teeth ratio. Here, the number-of-teeth ratio $i = Z_F/Z_C$ = (number of output teeth)/(number of input teeth). For example, the number of output teeth is the number of teeth of the second gear piece 212, and the number of input teeth is the number of teeth of the first gear piece 211.

If the formula (4) is solved for $Y = r_{C0}$, where $r_R = 0$ is set, then the graph of FIG. 9B is obtained by substituting $r_{F3} = r_{F0}$ and $r_{C0}/r_{F0} = Z_C/Z_F$.

If the formula (4) is solved for $Y = r_{C0}$, where $r_R = 0$ is set, then the graph of FIG. 9A is obtained by substituting $r_{F3} = r_{F0}$ and $r_{C0}/r_{F0} = \alpha \cdot Z_C/Z_F$ ($\alpha > 1$).

Referring to FIG. 4, in the embodiment, a pair of axially fixed gear pieces, that is, the first and fourth gear pieces 211, 214 are provided. The pair of gear pieces 211, 214, respectively, are engaged with the corresponding side surfaces 71 and 72 of the inner race 391 as an axially oscillating gear piece. In this case, in the third oscillating gear device 89 including two pairs of axially fixed gear pieces and axially oscillating gear pieces, vibration and noise can be suppressed.

The transmission ratio variable mechanism 5 of the embodiment uses the third oscillating gear device 89 of the embodiment. The transmission ratio variable mechanism 5 includes the input member 20 provided with the first gear piece 211 as one of the pair of axially fixed gear pieces, an output member 22 provided with the fourth gear piece 214 as the other of the pair of axially fixed gear pieces, the inner race 391 as an intermediate member that is provided with second and third gear pieces 212, 213 as axially oscillating gear pieces and allows differential rotations between the input member 20 and the output member 22, and the electric motor 23 for the transmission ratio variable mechanism for driving the above-described intermediate member. In this case, by driving the intermediate member by the electric motor 23, the ratio of the rotation angle of the output member 22 to the rotation angle of the input member 20 can be varied.

Referring to FIG. 1, the motor vehicle steering system 1 of the embodiment can vary the transmission ratio that is a ratio of the output superimposed angle of the transmission ratio variable mechanism 5 to the steering angle of the steering member 2. The input member 20 is coupled to the steering member 2, and the output member 22 is coupled to the second shaft 12 as a steered wheel side member.

Accordingly, by making the transmission ratio variable, the steered angle of the steered wheels 4R and 4L with respect to steering of the steering member 2 can be optimized according to a vehicle traveling state, etc. For example, when a motor vehicle stops or travels at a low speed as in the case of parking, the steered angle of the steered wheels per steering angle can be made larger, by increasing the transmission ratio, and the operation amount of the steering member can be reduced. When a motor vehicle travels on a snowy road, etc., so-called active steering in which a counter steering operation is automatically performed by the transmission ratio variable mechanism becomes possible.

Referring to FIG. 1 and FIG. 2, the operation of the VGR function is as follows. When the rotor 231 of the transmission ratio variable mechanism motor 23 rotates and a driver holds the steering member 2 so as to restrict the input member 20 from rotating, the rotor 231 rotates around the first axis Z1, and accordingly, the bearing ring unit 39 makes the so-called coriolis-move. Accordingly, the inner race 391 nearly rotates the input member 20 and the output member 22 reversely to each other. However, the rotation of the input member 20 is restricted, and therefore, only the output member 22 rotates.

At this case, the first gear piece 211 and the second gear piece 212 have a first number-of-teeth difference from each other, the third gear piece 213 and the fourth gear piece 214 have a second number-of-teeth difference from each other, and the first number-of-teeth difference and the second number-of-teeth difference are different from each other. Accordingly, during 360-degree rotation of the outer race 392 of the bearing ring unit 39, the inner race 391 rotates by an amount corresponding to the first number-of-teeth difference. Further, the output member 22 rotates by an amount corresponding to the second number-of-teeth difference. As a result, the rotation of the rotor 231 of the transmission ratio variable mechanism motor 23 is decelerated and output.

When the rotor 231 of the transmission ratio variable mechanism motor 23 rotates and the driver steers the steering member 2 so as to rotate the input member 20, the rotation amount of the output member 22 becomes a value obtained by adding the rotation of the input member 20 (steering member 2) to the rotation amount in the above-described case (the case in which the rotor 231 rotates and the driver holds the steering member 2 so as to restrict the input member 2 from rotating).

Accordingly, when the motor vehicle travels at a comparatively low speed, the function of assisting driver's steering by amplifying the steering angle $\theta 1$ can be performed.

When the motor vehicle travels at a comparatively high speed, for example, by comparing the steering angle $\theta 1$ and the yaw rate $\lambda$ of the motor vehicle, the behavior of the motor vehicle is determined. As a result, when the behavior of the motor vehicle determined from the steering angle $\theta 1$ is not equal to the behavior of the motor vehicle determined from the detected yaw rate $\lambda$, by increasing or reducing the speed of rotation of the rotor 231 of the transmission ratio variable mechanism motor 23, the vehicle stability control (posture stabilization control) is performed. At this time, driving of the transmission ratio variable mechanism motor 23 can also be controlled such that a counter steering operation is performed.

The following exemplary variation of the embodiment is possible. In the description hereinafter, differences from the above-described embodiment are mainly described. Other arrangements are not described here, and are the same as in the embodiment described above and designated by the same reference symbols.

For example, in the embodiment described above, there is described a case where the first gear piece 211 of the input member 20 is provided with the holding grooves 79 and the pins 77 and the second gear piece 212 of the inner race 391 is provided with the tooth grooves 80, however, the present invention is not limited to this case. For example, it is also possible that the second gear piece 212 of the inner race 391 is provided with the holding grooves 79 and the pins 77, and the first gear piece 211 of the input member 20 is provided with the tooth grooves 80. Similarly, it is also possible that the third gear piece 213 of the inner race 391 is provided with the holding grooves 109 and the pins 87, and the fourth gear piece 214 of the output member 22 is provided with the tooth grooves 110.

The essential requirement is that either one gear piece of the axially fixed gear piece and the axially oscillating gear piece includes a plurality of holding grooves aligned radially around the central axis of the one gear piece on the side surface of the one gear piece, and pins that are respectively held in the respective holding grooves and form teeth of the one gear piece. Additionally, it is preferable that the pins are arranged to engage with the tooth grooves 80 aligned radially around the central axis of the other gear piece of the axially fixed gear piece and the axially oscillating gear piece on the side surface of the other gear piece.

Instead of the pins 77 and the tooth grooves 80, pins having a circular truncated cone shape and tooth grooves having a shape fitting the pins may be used although these are not shown. The inner surface of this tooth groove is formed by a part of a conical surface, and can come into line contact or surface contact with the outer peripheral surface of the pin. The diameter of the pin becomes smaller as it goes toward the radially inner side of the gear piece having the pin. It is also possible that the pin 77 and the holding groove 79 are formed integrally by a single member. The same applies to the pin 87 and the tooth groove 110.

Adoption of either a case in which the number of teeth of the first gear piece 211 and the number of teeth of the second gear piece 212 are made equal to each other, or a case in which the number of teeth of the third gear piece 213 and the number of teeth of the fourth gear piece 214 are made equal to each other, is also possible. In this case, the formula (1) is applicable to the pair of gear pieces having different numbers of teeth.

In the above-described respective embodiments, the transmission ratio variable mechanism 5 is applied to the steering shaft 3, however, it can also be applied to the intermediate shaft 8 and the pinion shaft 15. In these cases, the output member 22 is coupled to the steered wheel side member (for example, in the embodiment described above, the second shaft 12) nearer the steered wheels 4R and 4L than the output member 22 in the transmission path in which the steering force is transmitted.

The transmission ratio variable mechanism and the oscillating gear mechanism of the present invention can be applied to devices other than the motor vehicle steering system. For example, the transmission ratio variable mechanism and the oscillating gear mechanism of the present invention can be applied to a toe angle variable mechanism capable of varying toe angles of wheels of a motor vehicle, a camber angle variable mechanical capable of varying camber angles of wheels of a motor vehicle, and a damping force variable mechanism capable of varying a damping force of a shock absorber of a motor vehicle. The transmission ratio variable mechanism and the oscillating gear mechanism of the present invention can be applied to general gear piece devices having a pair of an axially fixed gear piece and an axially oscillating gear piece, other than the motor vehicle steering system. Other various modifications can be made within the scope of matters described in the scope of claims.

The invention claimed is:

1. An oscillating gear device comprising:
    an axially fixed gear piece that has a central axis on a first axis and is rotatable around the first axis; and
    an axially oscillating gear piece that has a central axis on a second axis that oscillates while being inclined with respect to the first axis, and is rotatable around the second axis,
    wherein one gear piece of the axially fixed gear piece and the axially oscillating gear piece has a plurality of holding grooves aligned radially around the central axis of the one gear piece on a side surface thereof, and pins that are held in the holding grooves and constitute teeth of the one gear piece,
    wherein the pins are arranged to engage with tooth grooves aligned radially around the central axis of the other gear piece of the axially fixed gear piece and the axially oscillating gear piece on a side surface of the other gear piece,
    wherein the pin and the tooth groove engage with each other in engagement regions at a predetermined length with respect to the longitudinal direction of the pin, and
    wherein the following formula (1):

$$r_{C0}/r_{F0}=Z_C/Z_F \quad (1)$$

is satisfied, where $r_{C0}$ is a distance between an arbitrary point on the central axis of the pin in the corresponding section corresponding to the engagement regions of the pin as viewed in the radial direction of the pin and the first axis, $r_{F0}$ is a distance between the arbitrary point and the second axis, $Z_C$ is the number of pins of the one gear piece, and $Z_F$ is the number of tooth grooves of the other gear piece.

2. The oscillating gear device according to claim 1, wherein the gear piece including the plurality of holding grooves and pins is the axially fixed gear piece.

3. The oscillating gear device according to claim 1, wherein the gear piece including the plurality of holding grooves and pins is the axially oscillating gear piece.

4. The oscillating gear device according to claim 1, wherein
there are a pair of the axially fixed gear pieces that are a first axially fixed gear piece and a second axially fixed gear piece whose central axes are on the first axis,
there are a pair of the axially oscillating gear pieces that are a first axially oscillating gear piece and a second axially oscillating gear piece whose central axes are on the second axis, and that are formed integrally, and
the first axially fixed gear piece is engaged with the first axially oscillating gear piece, and the second axially fixed gear piece is engaged with the second axially oscillating gear piece.

5. The oscillating gear device according to claim 1, wherein the pins have a cylindrical shape.

6. The oscillating gear device according to claim 1, wherein the pins have a circular truncated cone shape.

7. A transmission ratio variable mechanism, comprising:
an input member;
an output member;
an intermediate member that allows differential rotations of the input member and the output member;
and an electric motor for driving the intermediate member,
wherein the input member is connected to a first axially fixed gear piece that has a central axis on a first axis and is rotatable around the central axis thereof, and the output member is connected to a second axially fixed gear piece that has the central axis on the first axis and is rotatable around the first axis,
wherein the intermediate member that has a first and a second axially oscillating gear pieces that have a central axis on a second axis that oscillates while being inclined with respect to the first axis, and is rotatable together around the second axis,
wherein the first axially fixed gear piece is engaged with the first axially oscillating gear piece, and the second axially fixed gear piece is engaged with the second axially oscillating gear piece,
wherein one gear piece of the axially fixed gear pieces and the axially oscillating gear pieces has a plurality of holding grooves aligned radially around the central axis of the one gear piece on a side surface thereof, and pins that are held in the holding grooves and constitute teeth of the one gear piece,
wherein the pins are arranged to engage with tooth grooves aligned radially around the central axis of the other gear piece of the axially fixed gear pieces and the axially oscillating gear pieces on a side surface of the other gear piece,
wherein the pin and the tooth groove engage with each other in engagement regions at a predetermined length with respect to the longitudinal direction of the pin, and
wherein the following formula (1):

$$r_{C0}/r_{F0} = Z_C/Z_F \quad (1)$$

is satisfied, where $r_{C0}$ is a distance between an arbitrary point on the central axis of the pin in the corresponding section corresponding to the engagement regions of the pin as viewed in the radial direction of the pin and the first axis, $r_{F0}$ is a distance between the arbitrary point and the second axis, $Z_C$ is the number of pins of the one gear piece, and $Z_F$ is the number of tooth grooves of the other gear piece.

8. The transmission ratio variable mechanism according to claim 7, wherein the gear piece including the plurality of holding grooves and pins is the axially fixed gear piece.

9. The transmission ratio variable mechanism according to claim 7, wherein the pins have a cylindrical shape.

10. A motor vehicle steering system capable of varying a transmission ratio as a ratio of a steered angle of steered wheels to a steering angle of a steering member, comprising a transmission ratio variable mechanism that includes an input member coupled to the steering member, an output member coupled to the steered wheels, an intermediate member that allows differential rotations of the input member and the output member, and an electric motor for driving the intermediate member,
wherein the input member is connected to a first axially fixed gear piece that has a central axis on a first axis and is rotatable around the first axis, and the output member is connected to a second axially fixed gear piece that has the central axis on the first axis and is rotatable around the first axis,
wherein the intermediate member that has a first and a second axially oscillating gear pieces that have a central axis on a second axis that oscillates while being inclined with respect to the first axis, and is rotatable together around the second axis,
wherein the first axially fixed gear piece is engaged with the first axially oscillating gear piece, and the second axially fixed gear piece is engaged with the second axially oscillating gear piece,
wherein one gear piece of the axially fixed gear pieces and the axially oscillating gear pieces has a plurality of holding grooves aligned radially around the central axis of the one gear piece on a side surface thereof, and pins that are held in the holding grooves and constitute teeth of the one gear piece,
wherein the pins are arranged to engage with tooth grooves aligned radially around the central axis of the other gear piece of the axially fixed gear pieces and the axially oscillating gear pieces on a side surface of the other gear piece,
wherein the pin and the tooth groove engage with each other in engagement regions at a predetermined length with respect to the longitudinal direction of the pin, and
wherein the following formula (1):

$$r_{C0}/r_{F0} = Z_C/Z_F \quad (1)$$

is satisfied, where $r_{C0}$ is a distance between an arbitrary point on the central axis of the pin in the corresponding section corresponding to the engagement regions of the pin as viewed in the radial direction of the pin and the first axis, $r_{F0}$ is a distance between the arbitrary point and the second axis, $Z_C$ is the number of pins of the one gear piece, and $Z_F$ is the number of tooth grooves of the other gear piece.

11. The motor vehicle steering system according to claim 10, wherein the gear piece including the plurality of holding grooves and pins is the axially fixed gear piece.

12. The motor vehicle steering system according to claim 10, wherein the pins have a cylindrical shape.

* * * * *